May 24, 1927.

H. S. BILDERBACK ET AL 1,630,106

METHOD OF AND MACHINE FOR MOLDING ROLLS

Filed Sept. 14, 1925   5 Sheets-Sheet 1

Inventors:
C. A. Franke,
H. S. Bilderback,
by Wm. F. Freudenreich
Atty.

May 24, 1927.
H. S. BILDERBACK ET AL
1,630,106
METHOD OF AND MACHINE FOR MOLDING ROLLS
Filed Sept. 14, 1925 5 Sheets-Sheet 2
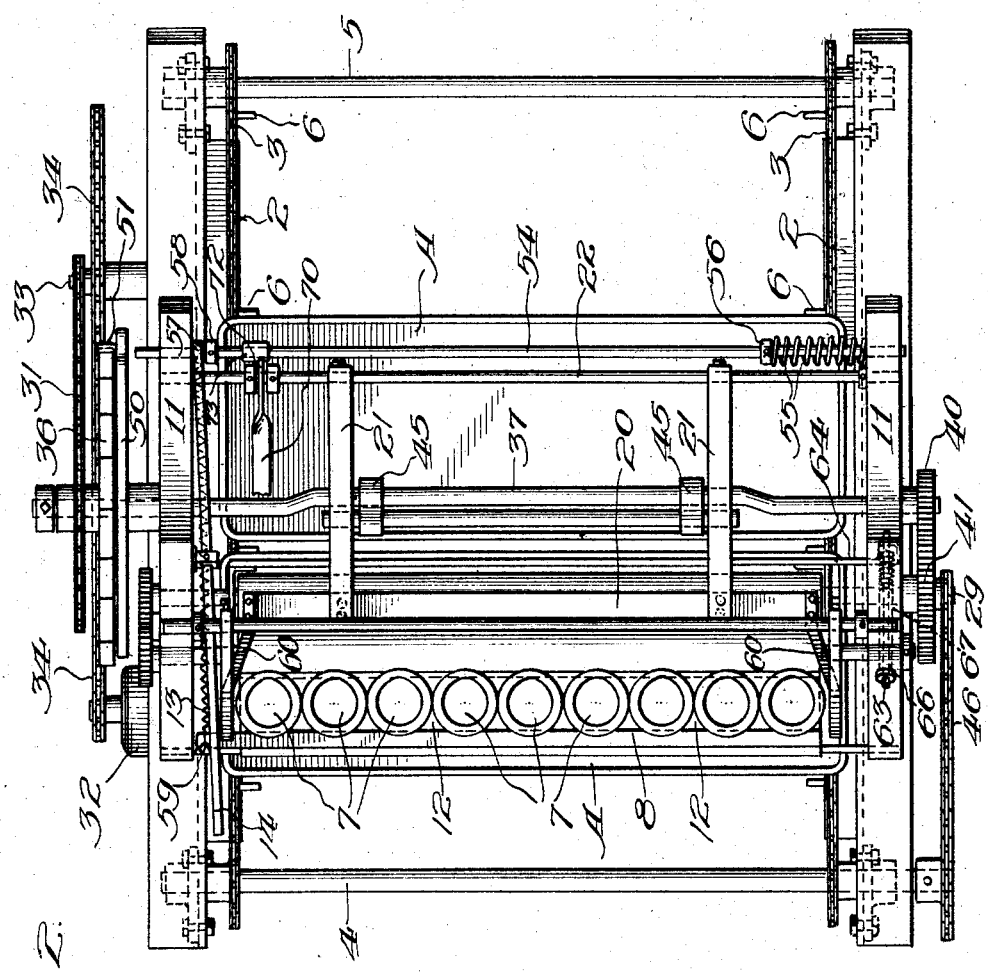

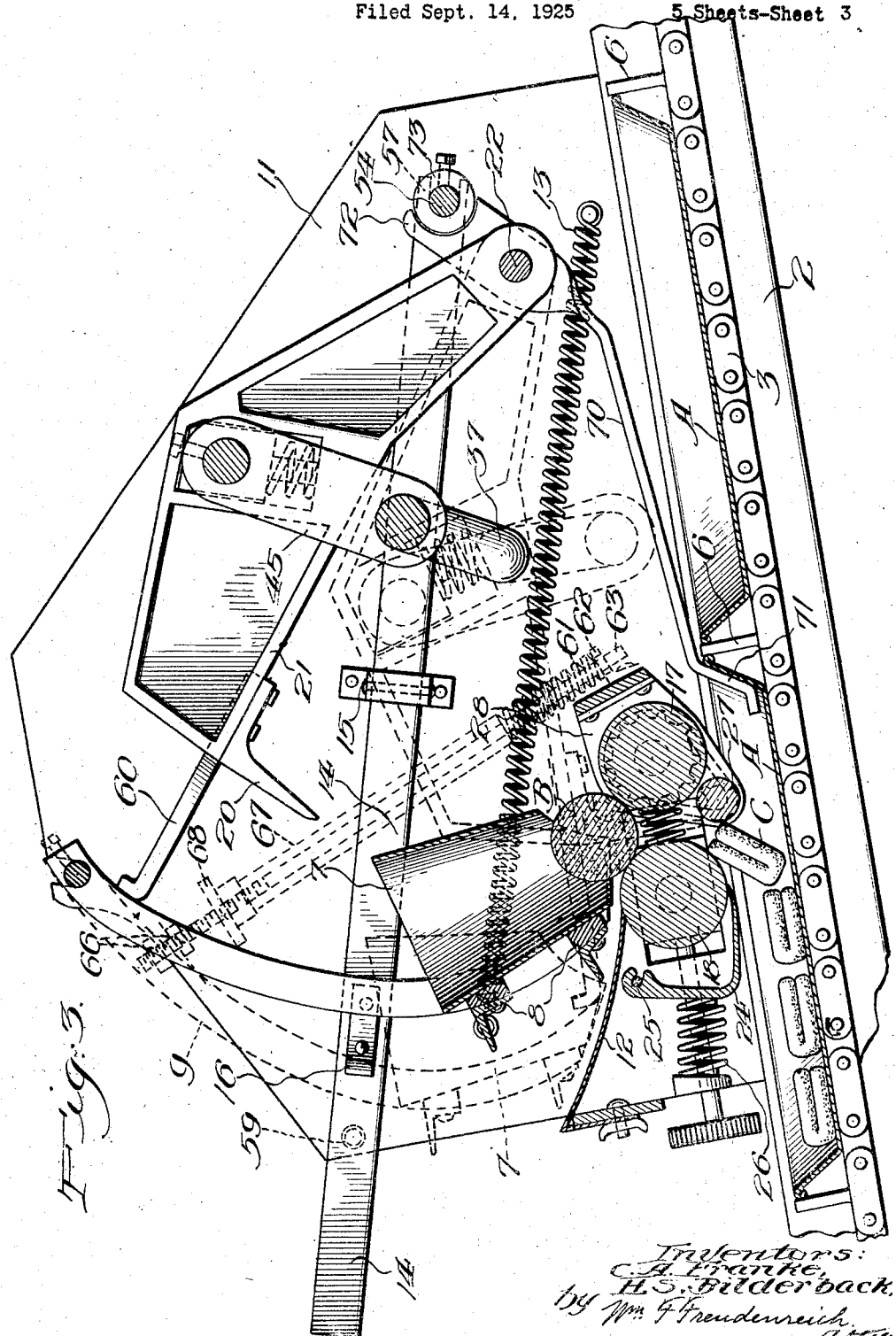

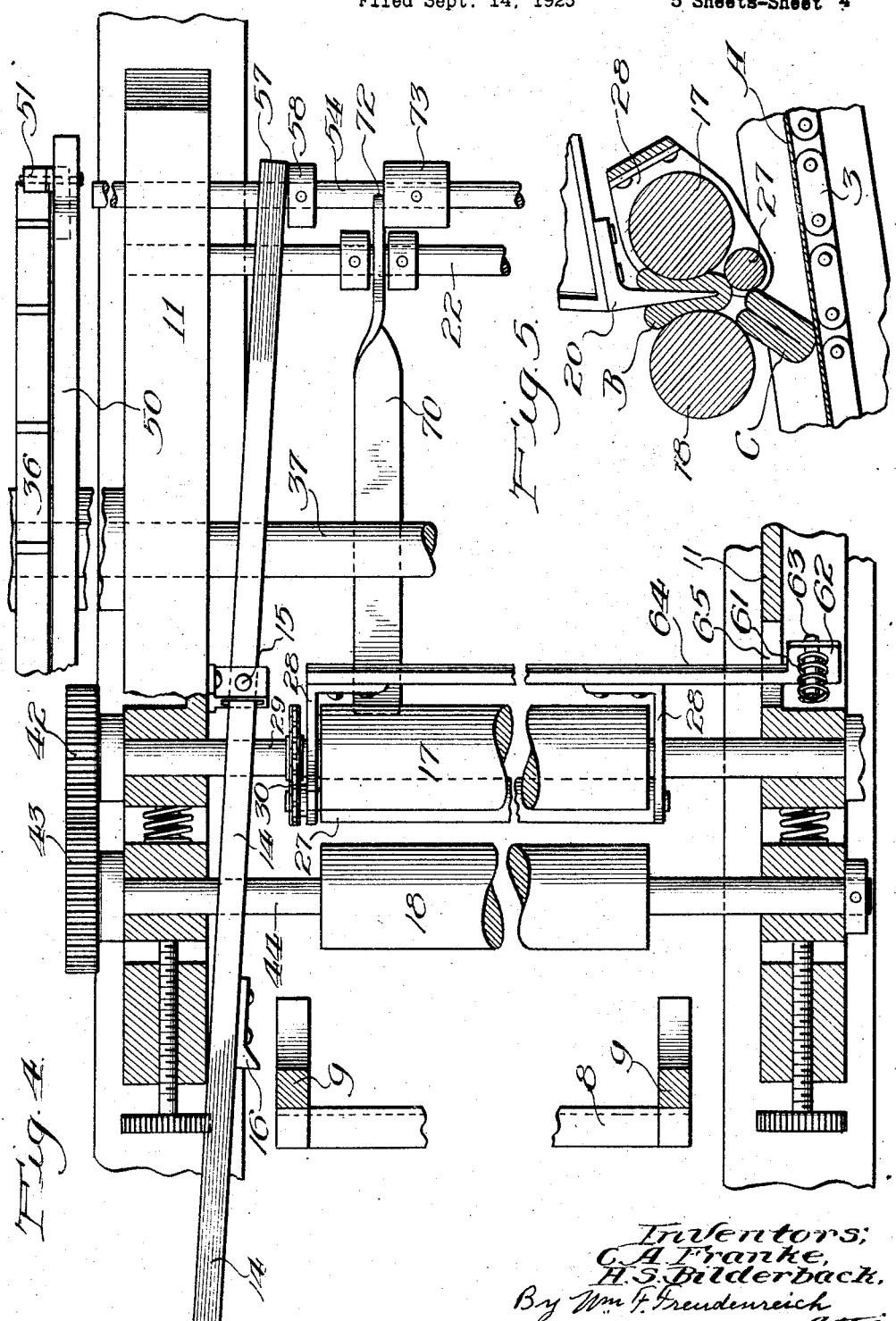

May 24, 1927.
H. S. BILDERBACK ET AL
METHOD OF AND MACHINE FOR MOLDING ROLLS
Filed Sept. 14, 1925   5 Sheets-Sheet 5
1,630,106
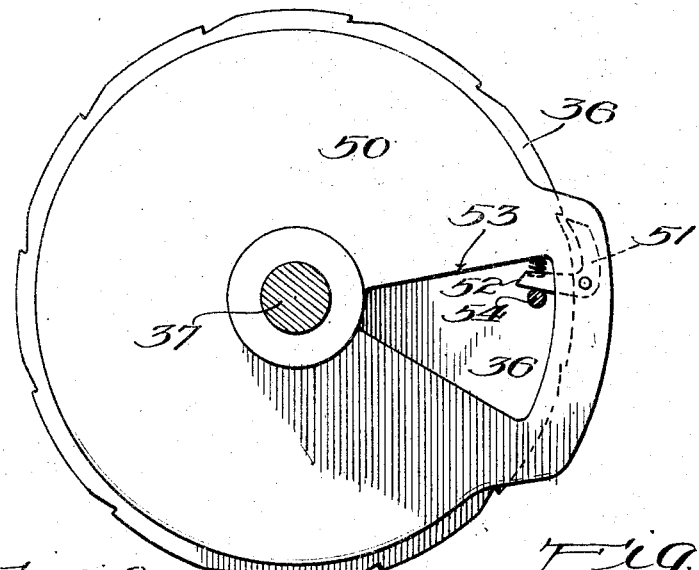
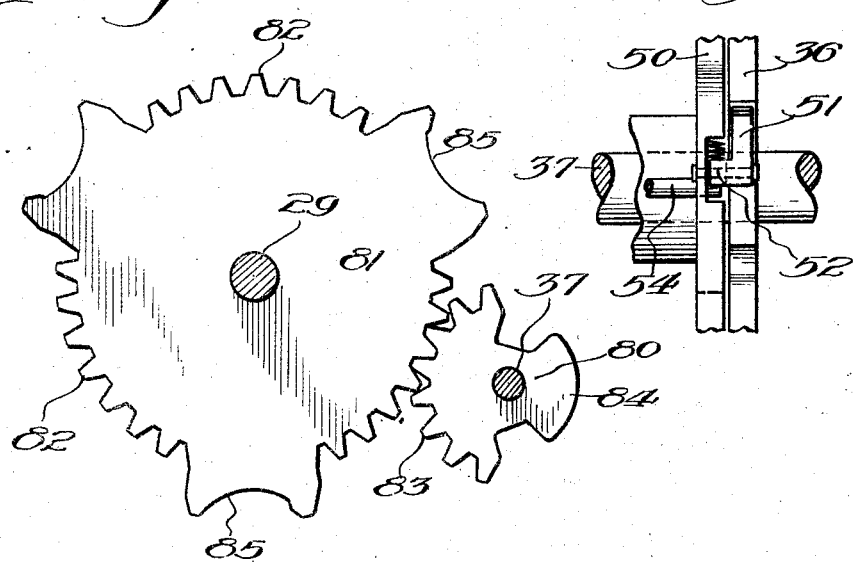
Inventors:
C. A. Franke,
H. S. Bilderback
by
Atty.

Patented May 24, 1927.

1,630,106

UNITED STATES PATENT OFFICE.

HENRY S. BILDERBACK, OF ELK CITY, OKLAHOMA, AND CHARLES A. FRANKE, OF LITTLE ROCK, ARKANSAS.

METHOD OF AND MACHINE FOR MOLDING ROLLS.

Application filed September 14, 1925. Serial No. 56,119.

Specifically considered, the present invention relates to the manufacture of so-called pocket book or Parkerhouse rolls or the like, although it may be usefully employed for other purposes.

Rolls of the kind to which we have referred consist of a single piece folded upon itself at or near the middle. One of the objects of the present invention is to produce a simple and novel method of making such rolls directly from a lump or ball of dough.

Another object of the present invention is to produce a simple and novel machine for transforming a ball of dough or other plastic material into a flattened piece folded upon itself.

A further object of the present invention is to produce a simple and novel machine for forming folded rolls or the like and depositing them evenly in pans or other receptacles.

A further object of the present invention is to produce a simple and novel machine for automatically forming folded rolls or the like and automatically moving pans or other receptacles in such time relation to the forming mechanism and in such positions relatively thereto that any desired number of pans or receptacles will be automatically filled with completed rolls.

The various features of novelty whereby our invention is characterized will hereinafter be pointed out with particularity in the claims; but for a full understanding of our invention and all its objects and advantages, including those heretofore enumerated and others, reference may be had to the following detailed description taken in connection with the accompanying drawings, wherein:

Figure 1 is a vertical section taken on a plane extending from front to rear of a machine embodying our invention; Fig. 2 is a plan view of the machine; Fig. 3 is a view similar to Fig. 1, on a much larger scale, only a portion of the machine being shown, and the parts being in different positions from those in which they appear in Fig. 1; Fig. 4 is a top plan view, parts in section, of a fragment of the machine, showing the controlling lever in a different position from that in which it appears in Fig. 2; Fig. 5 is a vertical section through the forming mechanism and fragment of the pan for receiving the rolls, and the carrier for the pan; Fig. 6 is a side view of the pawl-carrying driving arm and the ratchet wheel with which it co-operates; Fig. 7 is an edge view of a fragment of the pawl-carrying driving arm and the ratchet wheel; and Fig. 8 is a detail showing a step by step drive for the forming rollers.

In the drawings we have illustrated a simple machine for carrying out our invention for the production of rolls and, for the sake of brevity, the detailed description will be confined to this specific embodiment; although it will of course be understood that our invention is applicable to other uses and that the mechanism may be widely varied without departing from the spirit of our invention.

Referring to the drawings, 1 is a suitable frame or base having at the top a table which may consist simply of a pair of rails 2 extending from front to rear on opposite sides of the frame. There are two endless chains 3, each extending across the top and underneath one of the rails; these chains running over sprocket wheels on shafts 4 and 5 extending transversely of the machine at the front and rear ends of the latter. Each chain has distributed along the same, on the inner side thereof, a series of lugs or brackets 6 that project upwardly above the upper run of the chain and downwardly from the lower run.

The lugs or brackets are spaced apart sufficiently far to permit a baking pan A or the like to be inserted between consecutive brackets. The distance between the chains is somewhat less than the length of the pans or receptacles to be filled, and the chains are initially so placed with respect to each other that the brackets on one are directly opposite the brackets on the other. Therefore, assuming that the upper runs of the chains, when they travel, move from the rear toward the front, it will be seen that whenever two pairs of brackets appear at the top of the machine, at the rear end, a pan may be set on the chains between them and will then be carried by the chains toward the front of the machine.

The rolls are adapted to be made automatically from individual balls of dough. These balls are placed in a row of feeder chutes 7 extending transversely across the machine above the front thereof, one ball of dough being placed in each chute. The chutes may take the form of bottomless cups supported on a swinging frame, comprising a pair of cross bars 8 fixed at their ends to two arms 9 pivotally supported at their upper ends as indicated at 10, upon two vertical side frame members 11 rising above the top of the machine. The chutes may therefore swing as a single unit forwardly and rearwardly. When the chutes are in their forward position, as shown in Fig. 1 and in dotted lines in Fig. 3, their lower open ends are closed or at least partially closed by means of a curved stationary plate 12. The plate 12 is made of such a width that when the chutes are in their rearmost position, as shown in full lines in Fig. 3, the bottoms of the chutes are no longer covered and the balls of dough, such as indicated at B, may drop out of the chutes. A spring 13, acting on the swinging frame, tends constantly to draw it toward the rear. The swinging frame, with its chutes, may be locked in its forward position by a controlling lever 14 extending from the front toward the rear of the machine at one side thereof, and pivotally supported from the frame of the machine, as indicated at 15, to permit it to be swung in a transverse plane. The controlling lever has thereon a lateral projection 16 in position to be swung behind one of the curved arms 9 of the swinging frame, when the chutes are in their forward position, thus locking the chutes in this position against the tendency of the spring to swing them back.

When the balls of dough drop out of the chutes, they are taken by the forming mechanism, transformed into rolls, and delivered into the pans or other receptacles. The forming mechanism comprises two parallel rollers, 17 and 18, extending across the machine a short distance above the chains or carriers and in such positions that the balls of dough drop into the space between them when they leave the chutes. The rollers are not spaced sufficiently far apart to permit the balls of dough to drop down between them, but the balls are supported by the rollers until a descending plunger presses them down and at the same time partially divides them. The plunger is shown as taking the form of a long heavy blade 20 extending across the machine and fixed to the free ends of a pair of supporting arms 21 each of which is journalled at one end upon a stationary transverse shaft 22 extending between the side frames 11 at the rear end of the machine. The parts are so proportioned that the plunger may move from an upper position such as is shown in full lines in Fig. 3, at which time it lies clear of the chutes, to a lower position shown in dotted lines in Fig. 3 and in full lines in Fig. 1; in which lower position it extends down through the space between the forming rollers preferably below a plane containing the axes of rotation of the forming rollers, but out of contact with both of the rollers. It will thus be seen that if the rollers are rotated in a direction tending to draw the balls of dough down between them, and the plunger is swung down, the plunger will engage each ball at about the center and, since the dough is yielding, will cut into the balls and at the same time force them down. The parts may easily be so proportioned and their movements so timed that the part that is formed in the balls extends just the desired distance into the same, whereby the product as it leaves the rollers, on the under side of the latter, has the proper shape to produce the desired finished roll when baked.

In order to prevent the finished product from adhering to the rollers and to insure that they will be placed properly in the pans, we have associated with the forming rollers suitable stripping and placing devices. In the arrangement shown, the stripping device is simply a scraping blade 24 suspended at a point in front of the roller 18, as indicated at 25, and having its blade proper underlying the roller. A spring 26 acts on the scraper in a direction yieldingly to press the edge of the blade against the under side of the roller. The placing device we have shown is a small roller 27 parallel with the roller 17 and 18 and lying below the space between the rollers 17 and 18, but nearer to the former than the latter. The roller 27 is supported by a U-shaped frame 28 the arms of which are journalled midway between their ends on the shaft 29 that supports the roller 17; and it is driven from this shaft by suitable sprocket chain drive 30, so as to rotate in the same direction as the roller 17. Assuming that the roller 18 rotates in the clockwise direction, as viewed in Fig. 3 and that the roller 17 and the placing roller 27 rotate in the counterclockwise direction, it will be seen that as the ball B is pressed down by the plunger and is transformed by the plunger and the rotating forming rollers into the folded element C. This element does not drop down vertically, but is held for a time between the rollers 18 and 27 to be caused to be supported until its lower end is just about to engage with the bottom of the pan into which it is to drop. The completed rolls will therefore be accurately deposited in the pans.

The movable parts may be operated in proper time relation to each other by any suitable mechanism under the control of the lever 14. In the arrangement shown, power is derived from a motor 32 mounted in the lower portion of the base of the machine; the motor driving a countershaft 33 through suitable speed reducing gearing which, as shown, includes a sprocket chain 34 and a large sprocket wheel 35 on the countershaft. The countershaft, in turn, drives a large ratchet wheel 36 loose on a crank shaft 37 extending across the machine below the swinging arms 21 that carry the forming plunger, the driving connection being shown as a sprocket chain 31 passing over sprocket wheels 38 and 39 fixed respectively to the countershaft, and one end of the crank shaft. On the other end of the crank shaft is a pinion 40 meshing with a gear wheel 41 on the shaft 29 that supports the forming roller 17. On the opposite end of the shaft 29 is a gear wheel 42 meshing with a similar wheel 43 on the supporting shaft 44 for the forming roller 18. The swinging arms 21 that support the forming plunger are connected to the crank shaft by connecting rods 45. The shaft 29 and the shaft 4 that supports one end of the carrier chains are provided with sprocket wheels around which passes a sprocket chain 46.

It will therefore be seen that if the ratchet wheel 36 is clutched to the crank shaft, the forming rollers and the placing roller will be caused to revolve, the carrier chains will be set in motion and the forming plunger will be moved up and down. The parts are preferably so proportioned that the peripheral speed of the forming rollers and the placing roller is the same and is approximately equal to the linear speed of the carrier chains. The clutching of the ratchet wheel to the crank shaft may be brought about in any desired way. In the arrangement shown, there is a driving arm 50 fixed to the crank shaft and lying beside the ratchet wheel. On the driving arm is a pawl 51 tending constantly to engage with the ratchet wheel so as to cause the ratchet wheel to carry the arm with it. The pawl has finger 52 on the opposite side of the pivot from the working end of the pawl. When this finger is pressed toward the arm, namely upwardly as viewed in Figure 6, it brings about a disengagement of the pawl from the ratchet wheel. Normally the tripping finger of the pawl is engaged by the end of a transverse longitudinally-movable rod 54 that extends across the path of travel of the outer end of the arm 50 and strikes the finger to trip the pawl and free the arm from the ratchet wheel. The rod 54 may conveniently extend entirely across the machine through the two side frames 11 and be slidable therein in the direction of its length. A spring 55 is arranged between a collar 56 on the rod 54 and one of the side frames and tends constantly to push the rod into its pawl-releasing position. The rod is adapted to be moved into its idle position by the controlling lever 14 which has at one end a fork 57 that straddles the rod and lies just beyond the outer side of a collar 58 fixed to the rod. The spring on the rod could be used to return the actuating lever to its normal locking position but, under certain conditions, we desire to insure the return of the lever independently of any movement of the rod, and therefore place a spring 59 between the front end of the lever and one of the side frames 11; whereby the chutes may, at times, be locked by the lever in their forward position while the rod is still in its idle position. For the same reason we prefer to prevent the rod from returning to its pawl-releasing position until the crank arm has almost completed a revolution after being set in motion. This is conveniently accomplished by making the so-called arm, 50 in the form of a disc having a hole 53 therein opposite the finger 52 on the pawl. The pawl is placed near one side of the hole as shown in Fig. 6, so that, when the rod is withdrawn and the disc begins to revolve, the end of the rod almost at once comes opposite a solid part of the disc and is thus held by the latter, (in the idle position of the rod), until the disc has made almost a complete revolution.

In using the machine, the motor being in motion and the controlling lever in its normal locking position, and pans having been placed on the carriers: the operator places a ball of dough in each of the chutes and then moves the controlling lever to its release position as shown in Fig. 4. The swinging frame is released so that the chutes swing toward the rear and deposit their contents upon the forming rollers. The shifting of the lever also causes the rod 54 to be withdrawn from its locking position, so that the pawl 51 drops into engagement with the ratchet wheel, causing the crank shaft to turn with the ratchet wheel. The controlling lever need be held only momentarily whereupon it will return to its locking position ready to engage with the swinging frame when the latter is swung back toward the front; the disc 50 holding the rod 54 in its idle position until the disc has completed the greater part of a revolution and the hole 53 therein again comes opposite the end of the rod. As soon as the crank shaft begins to rotate, it causes the forming rollers and the placing roller to revolve and the plunger to descend. The chutes must be swung forward out of the way of the plunger and we therefore provide the plunger with forwardly extending arms 60 that engage with the members 9 of the swinging frame and push the frame forward until one of the members 9 drops in front of the projection on the controlling lever and is locked thereby. The forming rollers begin to revolve before the plunger strikes the balls of dough, thus insuring the proper centering of these balls in the space between the rollers without interference on the part of the plunger, and therefore when the plunger does engage with the dough it is acting on them in a perfectly centered condition. The crank shaft makes one complete revolution, at the end of which the pawl engages the tripping rod and is released from the ratchet wheel. At this time the plunger has been returned to its up position, so that the machine is ready to carry out another cycle of operations.

The finished rolls may be deposited in the underlying pan just before the crank shaft stops; or, they may still be held by the placing roller and the forming roller 18 when the machine stops, and thereafter be laid in the pan at the beginning of the next cycle of operations. The placing roller preferably extends down into the underlying pan, where an ordinary baking pan is used, so as to retain control of the rolls until about the time that they touch the bottom of the pan. It is for this reason that we have mounted the placing roller on a swinging frame, since this frame permits the roller to ride up along the rear side of each pan as the rear end thereof passes the roller, and drops down again into the front end of the next succeeding pan. In order normally to hold the placing roller in its proper position, we have placed the supporting frame under the control of a spring 61 placed between an ear 62 on this frame, and an adjustable shoulder on a stationary bolt 63 that passes loosely through the ear. The ear 62 is on the outer end of a lateral extension of the bar or plate 64 that forms the rear side of the frame 28 and extends laterally through a hole 65 in the web of one of the side frames 11, as best shown in Fig. 4. The bolt 63 extends forwardly and upwardly and is rigidly fastened at its front end to a part of the frame by nuts 66. Surrounding the bolt, above the spring, is a piece of tubing 67 that is engaged by a knurled nut 68 screwed on the bolt. By adjusting the nut 68 the resistance to bodily downward movement of the placing roller may be varied.

It is desirable that the machine be constructed to permit one pan after another to be filled without interruption. The parts may therefore be so proportioned and so timed that the distance between the center of each pan and the center of the following pan is an exact multiple of the pan travel during one cycle or forming operation. The pan edges are placed just close enough together so that one cycle of operations will move the pans from the position for completing the filling of one to the position for starting on the next pan. For instance, if each pan is wide enough to hold five rows of rolls, the movement is timed so as to require six cycles for each pan. Five of these cycles result in the forming of rolls, and means are provided for causing the sixth cycle to follow automatically after the fifth. Therefore the operator need only set the machine in operation to place the last row of rolls in a pan and then wait until the machine stops ready to form the rolls that constitute the first row in the next pan. This automatic control means is best shown in Figs. 3 and 4. Referring to these figures, it will be seen that there is a lever 70 journalled near its rear end upon the shaft 22 and having its front end bent downwardly, as indicated at 71. The lever is so proportioned that at the end of the fourth forming operation the bent end 71 engages with the rear wall of the pan that is being filled. Therefore, when the fifth forming operation begins, the bent end of the lever will ride up the inclined rear wall of the pan, swinging the lever upon its supporting shaft. At the rear end of the lever is a finger 72 that is adapted to be swung in front of a collar 73 fixed on the controlling rod 54 whenever the front end of the lever is swung up while the controlling rod is in its release position. It will therefore be seen that when the operator shifts the controlling lever 14 to start the fifth forming operation, the tripping rod 54 is brought into its release position, ready to be locked in that position by the finger 72 on the lever 70. The disc 50 holds the tripping rod in its idle position until it can be locked there by the lever 70; the movements of the lever 14 being therefore the same as during any other cycle of operations, so that the chutes will be locked in their forward position and the operator have ample time to fill them before they are required to discharge again. Then, when the machine has completed the fifth cycle, the pawl is not disengaged from the ratchet wheel, because the tripping rod is locked in its release position. Consequently, the crank shaft makes another revolution and, before that revolution is completed, the advancing end of the lever 70 drops into the next pan releasing the tripping rod and permitting it to disengage the pawl from the ratchet shaft. When the machine stops it is ready to form a row of rolls and place them as the first row in the empty pan following that which has just been filled.

In the machine as heretofore described, the forming rollers are rotating at the time the plunger strikes the balls of dough. It is sometimes advisable, however, to permit the plunger to cut into the dough and form or partially form the partings while the rollers are still stationary. To this end the forming rollers may be driven in such a manner that they rotate only a portion of the time during which the driving crank shaft rotates, permitting the plunger to descend during the idle periods of the forming rollers. A suitable arrangement for this purpose is shown in Fig. 8 wherein 37 represents the crank shaft heretofore described and 29 represents the shaft or journal of the rear forming roller. 80 and 81 represent cam gears that take the place of the gears 40 and 41 on the shafts 37 and 29, respectively. The gears, as shown, are designed to permit the crank shaft to make three revolutions for each revolution of the forming rollers. The movements of the forming rollers are not synchronous with those of the crank shaft, the latter rotating at a uniform speed and the cam rollers revolving at a corresponding speed only during the time one of the toothed sections 82 on the gear 81 is in mesh with the toothed segment 83 on the gear 80; whereas, during the time the arc-shaped section 84 on the gear 80 is turning in one of the concave seats 85 in the periphery of the gear 81, the latter gear and the forming rollers, are stationary. The mechanisms are so timed, when this modified construction is employed, that the plunger descends while the rollers are stationary, the rollers remaining thus until just before the plunger reaches the lower limit of its movement, at which time the rollers start to turn.

It will thus be seen that we have devised a method of making rolls or the like containing a parting that is simple, permitting rolls to be made rapidly in large quantities, and insuring uniformity of product. It will also be seen that we have produced a simple and novel machine for efficiently carrying out our improved method.

While we have illustrated and described in detail only a single form of machine for carrying out our invention, with a single modification, we do not desire to be limited to the details thus illustrated and described; but intend to cover all methods and arrangements coming within the appended claims which constitute definitions of our invention.

We claim:

1. The method of forming a roll or the like having a parting therein, which consists in rolling out a piece of dough and at the same time forcing into it, between the rolled faces, a member partially to divide the same.

2. The method of forming a roll or the like having a parting therein, which consists in flattening a ball of dough, and at the same time partially dividing it along a plane parallel with the flattened sides.

3. The method of joining a roll or the like having a parting therein which consists in forcing a ball of dough into a space narrower than the ball and at the same time partially dividing the ball, so as to form flattened sides parallel with the plane of division.

4. The method of forming a roll or the like having a parting therein, which consists in forcing a ball of dough between two rollers rotating in opposite directions, by applying to the ball, in the direction of travel of the ball, a pressure sufficient to produce a parting.

5. The method of forming a roll or the like, having a parting therein, which consists in forcing a ball of dough between two rollers rotating in opposite directions, by applying to the ball along a line extending across the same in the direction of the length of the rollers a pressure sufficient partially to divide the ball.

6. The method of forming a roll or the like having a parting therein, which consists in centering a ball of dough across the space between two separated rollers, rotating the rollers in opposite directions to tend to draw the dough between them, and forcing the ball into said space by applying pressure along a line extending across the same and in the direction of the length of the rollers.

7. The method of forming a roll or the like having a parting therein, which consists in placing a ball of dough between two separated members having opposed elements in their surface moving in the same direction, and then pressing a blade against the ball to force it in said direction between said members and at the same time produce a parting in the dough.

8. In combination, two rollers spaced apart from each other, means for rotating the rollers in opposite directions, and a blade-like plunger movable into and out of the space between the rollers.

9. In combination, two rollers spaced apart from each other, means for rotating them in opposite directions, a blade-like plunger extending in the direction of the length of the rollers, and means for moving said plunger into and out of the space between the rollers from a position such that the plunger in entering the space between the rollers is traveling in the same direction as the longitudinal elements on the inner sides of the rollers.

10. In a machine of the character described, means for rolling out a ball of plastic material, and means for forming in said material during the rolling operation a parting located between the rolled faces.

11. In a machine of the character described, means for flattening a mass of plastic material and means for forming a parting in said mass during the flattening operation along a plane parallel with the flattened sides.

12. In a machine of the character described, a movable carrier, mechanism for delivering rolls to the carrier, a controlling lever, means controlled by said lever for moving said carrier a step and causing one delivery of rolls upon each operation of the lever, and a controlling device for said means actuated by said carrier to cause the movements set in operation by said lever to be repeated at intervals.

13. In a machine of the character described, two rollers spaced apart from each other, a blade-like plunger movable into and out of the space between the rollers, and mechanism for driving the plunger and the rollers in such time relation that the rollers are stationary until the plunger has entered the space between them and then begin to rotate.

In testimony whereof, we sign this specification.

CHARLES A. FRANKE.
HENRY S. BILDERBACK.